United States Patent [19]

Page

[11] Patent Number: 4,902,188

[45] Date of Patent: Feb. 20, 1990

[54] TROLLEY CARRIER

[76] Inventor: Robert Page, 71 Dwyer Avenue, Little Bay, N.S.W. 2036, Australia

[21] Appl. No.: 890,842

[22] PCT Filed: Nov. 29, 1985

[86] PCT No.: PCT/AU85/00298

§ 371 Date: Jul. 29, 1986

§ 102(e) Date: Aug. 15, 1986

[87] PCT Pub. No.: WO86/03168

PCT Pub. Date: Jun. 5, 1986

[30] Foreign Application Priority Data

Nov. 29, 1984 [AU] Australia .............................. PG8360

[51] Int. Cl.⁴ .............................................. B60P 1/02
[52] U.S. Cl. .................................. 414/495; 298/23 D; 296/61; 414/458; 414/480; 414/537; 414/917
[58] Field of Search ............... 414/458, 459, 460, 467, 414/480, 495, 546, 557, 917; 254/2 R, 2 B, 2 C, 10 R, 10 B, 10 C; 298/23 D, 23 DF; 296/61, 51, 50, 57; 187/8.5, 8.52

[56] References Cited

U.S. PATENT DOCUMENTS

| | | | |
|---|---|---|---|
| 1,487,201 | 3/1924 | Brezovitz et al. | 298/23 D X |
| 2,230,014 | 1/1941 | Raven | 254/8 R |
| 2,822,944 | 2/1958 | Blomgren . | |
| 2,934,228 | 4/1960 | Hillberg . | |
| 3,066,816 | 12/1962 | Schwartz | 414/480 |
| 3,468,440 | 9/1969 | Poole . | |
| 3,707,238 | 12/1972 | Thibodeau | 414/458 |
| 4,005,788 | 2/1977 | Ratliff . | |
| 4,168,134 | 9/1979 | Pohl | 414/545 |
| 4,168,932 | 9/1979 | Clark | 298/4 R X |

FOREIGN PATENT DOCUMENTS

| | | | |
|---|---|---|---|
| 167832 | 1/1955 | Australia | 414/458 |
| 901517 | 1/1954 | Fed. Rep. of Germany | 414/458 |
| 960962 | 3/1957 | Fed. Rep. of Germany | 414/480 |
| 1127728 | 4/1962 | Fed. Rep. of Germany . | |
| 2520645 | 11/1976 | Fed. Rep. of Germany . | |
| 2754009 | 6/1978 | Fed. Rep. of Germany | 414/495 |
| 2004486 | 11/1969 | France . | |
| 149361 | 3/1955 | Sweden | 296/61 |
| 308030 | 3/1929 | United Kingdom | 296/61 |
| 1124791 | 8/1968 | United Kingdom . | |
| 1450337 | 9/1976 | United Kingdom | 414/537 |

OTHER PUBLICATIONS

Photographic picture of a type of vehicle put upon the market by Unihef ever since 1970, the vehicle comprises all the features mentioned in the claims of EP-A-0235148.

Photocopy of a brochure concerning a Unihef Citroen vehicle, date is 2/74, the vehicle meets all the features mentioned in the claims of EP-A-0235148.

Copy of a Dutch registration certificate of a Unihef-car having registration No. GG-09-BY, the date is Jan. 29, 1980.

Photo picture of the car of enclosure 3.

Copy of a Dutch registration certificate of a Unihef-car having registration No. FK-53-JN, the date is Sep. 19, 1979.

Photo picture of the car of enclosure 5.

Brochure relating to the Unihef-cars, one of the shown cars has registration No. BB-31-LT.

Registration certificate of registration No. BB-31-LT; the date is Aug. 28, 1981.

*Primary Examiner*—Frank E. Werner
*Attorney, Agent, or Firm*—Vorys, Sater, Seymour and Pease

[57] ABSTRACT

A vehicle for transporting shopping trolley or carts. The vehicle has a tray for the loading of the shopping trolleys, and adapted for movement from a transportation position to a lower loading position in which trolleys can be easily loaded thereon. The tray maintains a substantially constant horizontal orientation through this movement. A tailgate or rear ramp is positioned at the rear of the tray and is movable between a ground engaging position and a raised position generally blocking the rear of the tray. A mechanical leverage mechanism lowers the ramp as the tray is being raised and raises the ramp as the tray is being raised between their respective upper and lower positions.

15 Claims, 6 Drawing Sheets

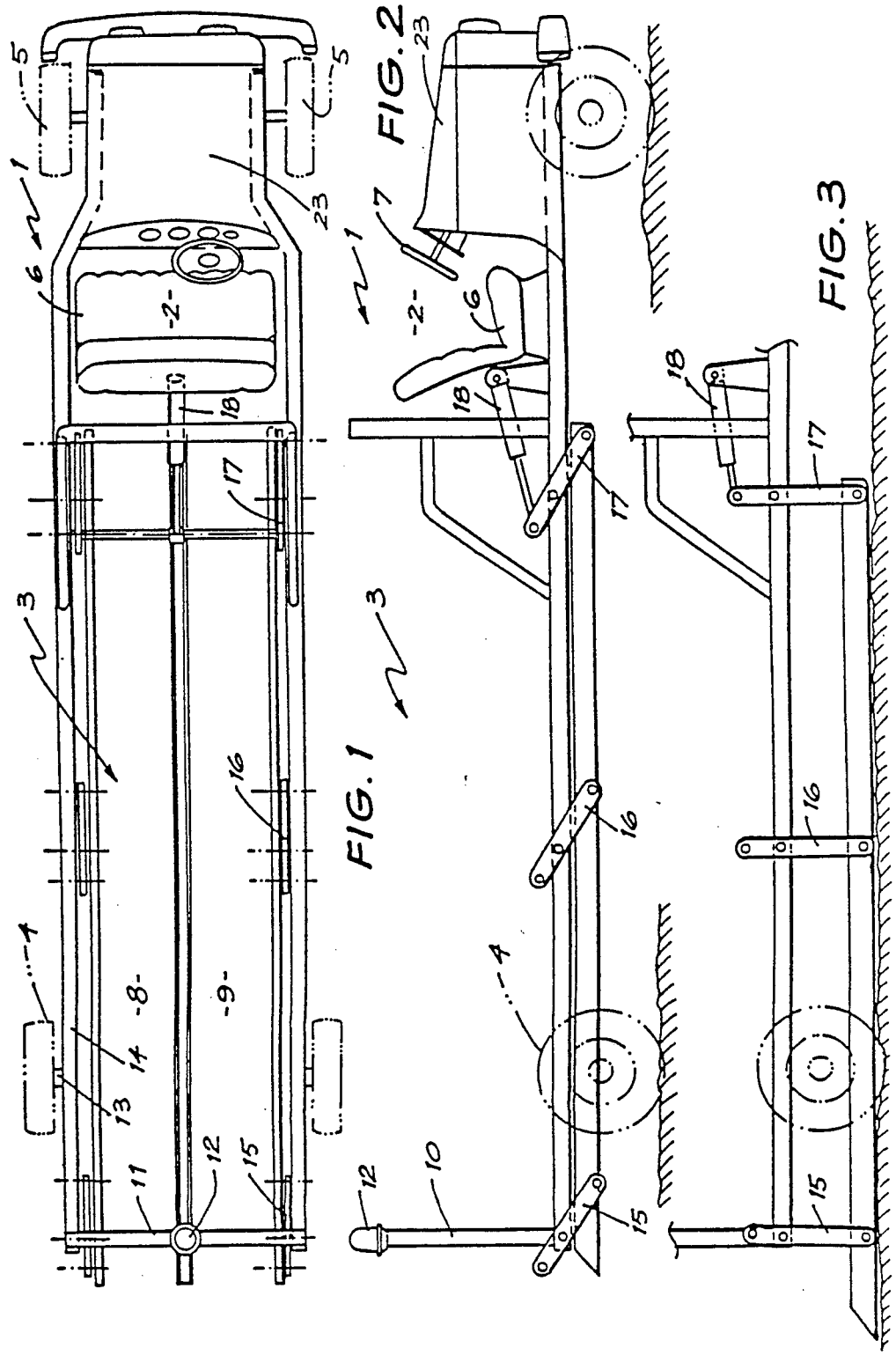

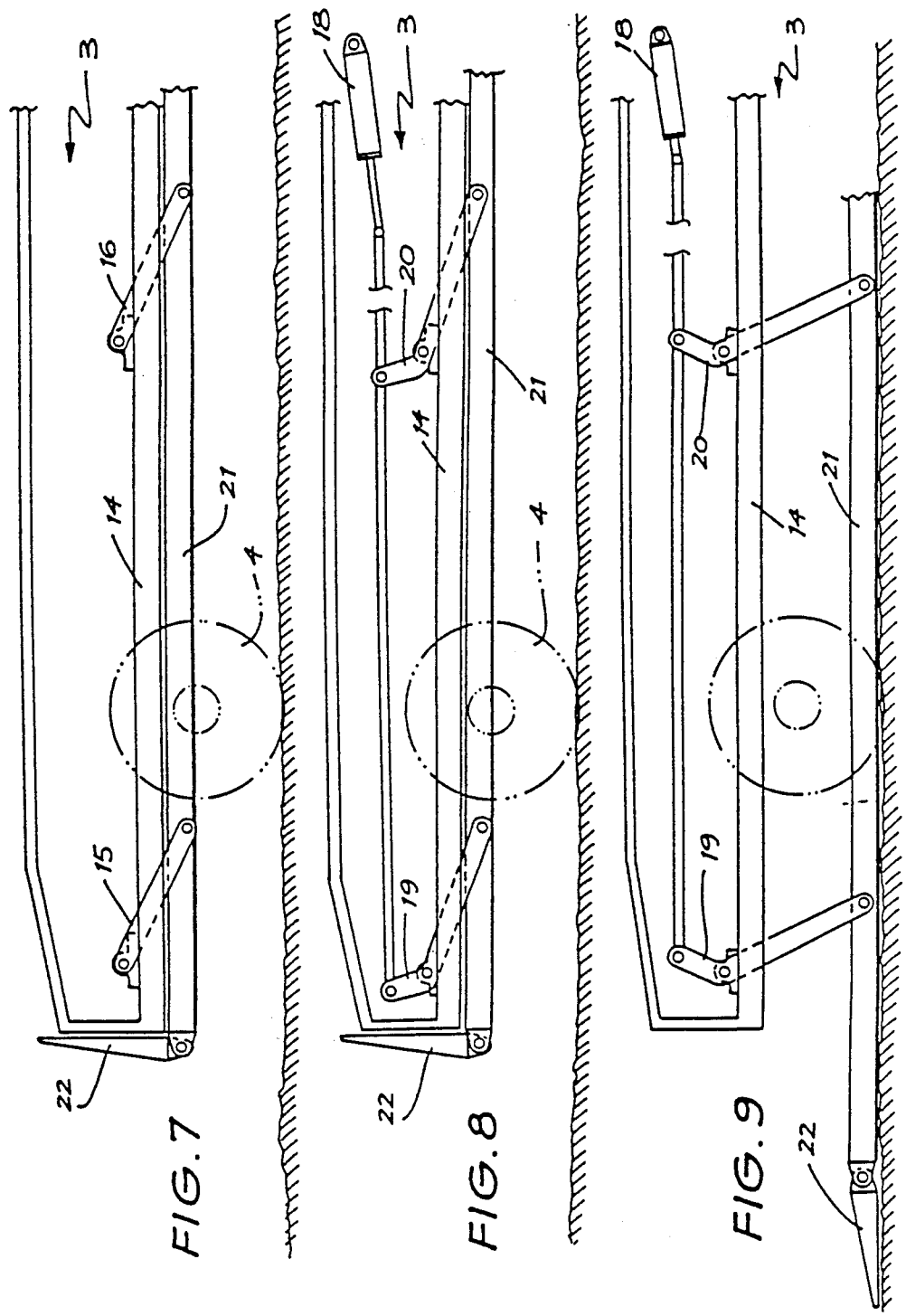

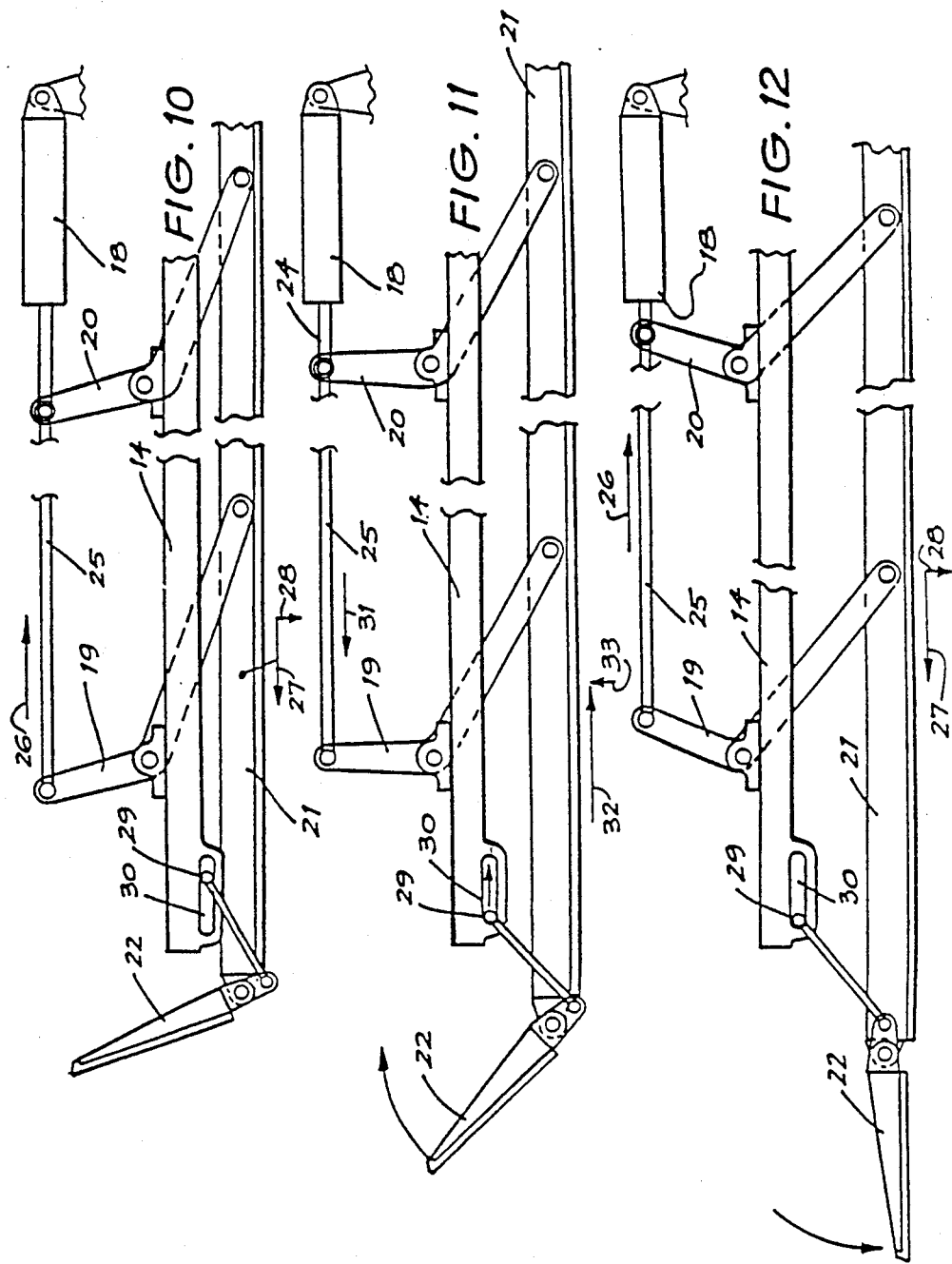

TROLLEY CARRIER

The present invention relates to vehicles, in particular motor vehicles for carrying specialised objects such as shopping trolley carts and the like.

Shopping trolley carts are a multimillion dollar industry. The advent of shopping complexes with very large supermarkets has meant an increase in the number of these trolleys which are required. Further, as the complexes are large and require a great deal of parking space for customers, there usually results the littering of these car parks with "once used" abandoned trolleys. This happens either due to tiredness or laziness on the part of the customer. Particularly in view of the expansive nature of the car parks, the customers decide that it is too far to return the trolley back to its pick-up point, and simply leave them in the car park.

In the past, it has been the job of attendants to roam the car parks and retrieve the trolleys which are usually scattered, or if customers have been considerate, are located in a centralised collection area in the car park itself. However, as the cost of labour increases this task is getting more expensive and is usually an unpleasant task for employees.

For obvious reasons, the shopping trolleys cannot be left in the car parks as they become damaged due to corrosion, collision with motor vehicles and customers, damage through vandalism or lost through theft. The routine maintenance bill to large supermarket chains and the like is ever on the increase and this sort of damage increases by very large amounts, this maintenance bill.

There have been proposed vehicles to overcome this problem however, such prior art collection vehicles are of a front fork lift configuration. These vehicles rely on the trolley carts being first nested together, then the operator of the fork lift moving the very large forks or prongs on the vehicle into engagement with the nested trolleys. Once the nested trolleys have been "speared" they are carried to a collection area or location close to the point where they will be reintroduced into customer service.

This system has many disadvantages, which include the following:

(a) The fork lift vehicle when unloaded has prongs which extend forwardly, which are a danger both to pedestrians and motor vehicles.

(b) When loaded, the fork lift vehicle operator has a great deal of his vision obscured, as it is necessary to angle the nested trolleys to prevent them sliding off the prong or fork. This is obviously a danger to both pedestrians and motor vehicles in the parking lots.

(c) A nest of trolleys, sometimes ten to twelve at a time, is loaded on the fork, which as mentioned previously, is then tilted to prevent the trolleys falling off. This means that the lower most trolleys, once they have been angled, bear a great deal of weight, in a manner in which the trolleys are not designed to do.

(d) By virtue of the angling of the trolleys to prevent them falling off the fork, the trolleys can become jammed together and once released from the fork are placed into service in a conglomerated unit, which is very difficult to separate by the customers for immediate use.

(e) Due to the nature of engagement with the trolleys prongs of the fork of the fork lift vehicle, there is the potential, if used by untrained personnel, to actually damage the trolleys during the "spearing operation". Also the power operated fork lifts can tend to crush and dent the walls of the trolleys.

(f) As the trolleys are brought back to ground after transportation, the trolleys can be dropped and damaged.

It is an object of the present invention to provide a vehicle for collecting trolleys which substantially overcomes or ameliorates the abovementioned disadvantages.

According to one aspect of the present invention there is disclosed a vehicle comprising a wheeled body and a tray section which is moveable between a transportation position and a lower loading position, said tray being connected to the wheeled body such that said tray retains substantially the same horizontal orientation throughout its movements. Further, it is preferred that the loading section comprises two elongated carrying bays, one end of each carrying bay being terminated by said cabin section, and the other end adapted to be closed off by a rope, chain, cable or the like. In another embodiment the trolleys are prevented from falling off the vehicle by means of a rear ramp.

An embodiment of the present invention will now be described by way of example only, with reference to the accompanying drawings in which:

FIG. 1 is a schematic part plan view of an embodiment of the present invention;

FIG. 2 is a side elevational view of the apparatus of FIG. 1;

FIG. 3 illustrates the loading section of the apparatus of FIGS. 1 and 2 in the lowered position;

FIGS. 7 to 12 illustrate in more detail the raising and lowering of the load carrying section and of a rear ramp and platform;

Figure 13:
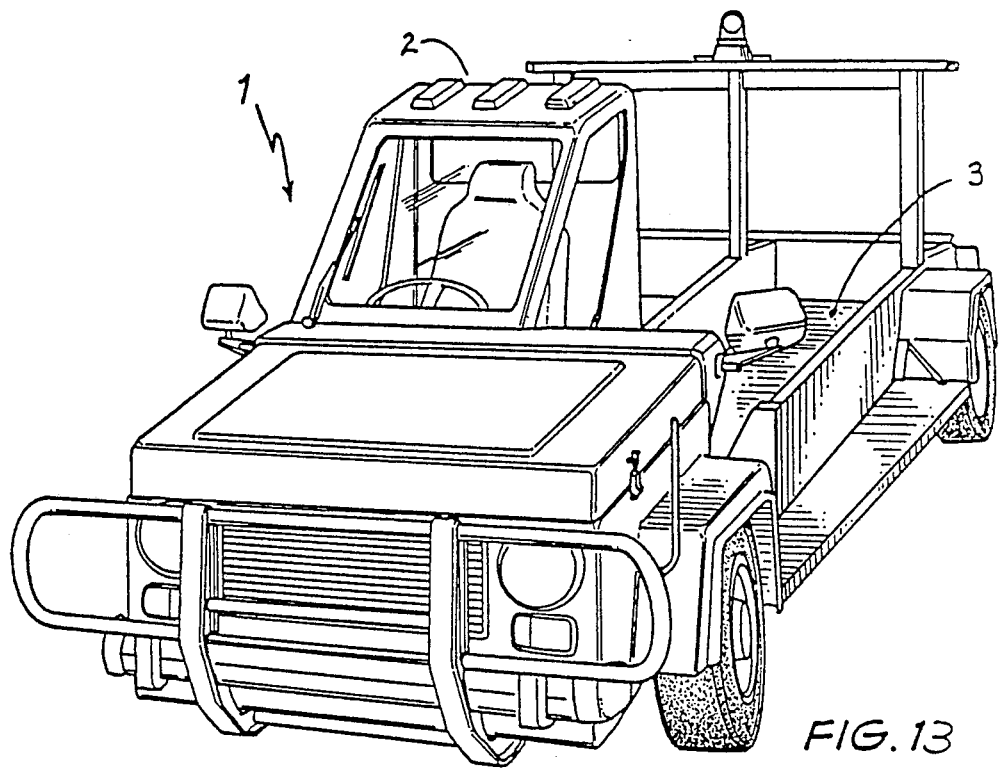
FIG. 13 is a perspective view of the embodiment illustrated in FIG. 1.

As illustrated in FIGS. 1, 2 and 13, the vehicle generally designated by the numeral 1, includes a cabin section 2 and rear load carrying section 3. The vehicle is supported upon free rolling wheels 4 and drive wheels at the front of the vehicle 5. The vehicle is driven in a manner conventional to front wheel drive motor vehicles. The cabin section 2 comprises a seat 6 for an operator and a steering wheel 7 to control the direction of the vehicle. Other standard controls such as manual or automatic transmission and other instruments and controls as are standard to conventional motor vehicles are located in the cabin section 2.

The rear load carrying section 3 will now be described with reference to FIGS. 1 to 6. The carrying section 3 comprises carrying bays 8 and 9 in which are rolled and secured into place shopping trolleys (not illustrated) which are collected from various locations. The bays 8 and 9 each hold a maximum of ten trolleys, making the total carrying capacity of the vehicle twenty trolleys. The carrying capacity of the bays 8 and 9 is limited only to the length of the bay 8 and 9. For ease of moving trolleys (not illustrated) in and out of the bays 8 and 9 and to provide adequate support, the bays 8 and 9 will only load a single row of nested trolleys in each bay. This means that the vertical support 10 can provide adequate support to the righthand side of the bay 8 and to the lefthand side of the bay 9.

A top of the vertical support 10 which is suspended from an arch 11 is a flashing light 12 which warns customers, motorists and others of the presence of the vehicle 1 by directing attention to the flashing light 12. The rear free rolling wheels 4 are mounted on stub axles 13 which are in turn supported on the chassis members 14. The chassis members 14 form a "wishbone" or "tuning fork" chassis arrangement. This permits the carrying bays 8 and 9 to be raised and lowered and still be adequately supported.

Figures 4, 5:
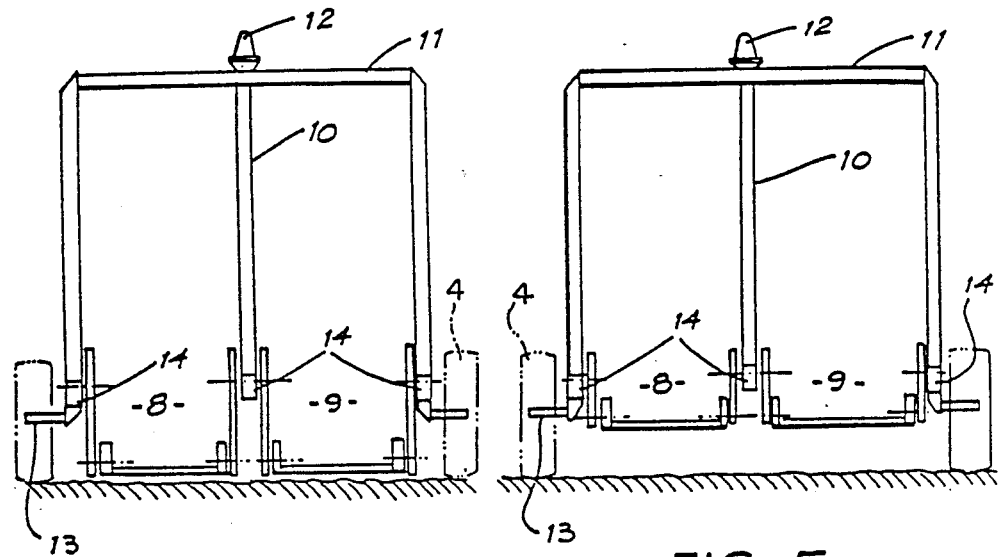
FIG. 4 is a rear elevation view of FIG. 3.
FIG. 5 is a rear elevation view of the apparatus of FIG. 2.

Due to the weight of ten nested trolleys, the task of placing the trolleys in the bay 8 or 9 would be very difficult if it were to be performed by moving the trolleys up a ramp and onto the bays 8 and 9, if the bays 8 and 9 were in the position as illustrated in FIG. 5. In order to remedy this situation bays 8 and 9 are moveable between the position illustrated in FIG. 5 and that illustrated in FIGS. 3, 4 and 6. This movement is performed by a series of linkages 15, 16 and 17 which are driven by a hydraulic cylinder 18. If the cylinder 18 if powerful enough to move both bays 8 and 9 when fully loaded, then only one cylinder 18 will be needed. However, in the preferred embodiment, there are located two such cylinders 18 at either side of the vehicle 1.

The linkages 15, 16 and 17 are here illustrated as straight linkages however "dog leg" linkages 19, 20 as illustrated in FIGS. 8 to 12 can be utilised and are in fact preferred. Referring now to FIGS. 8 to 12, it will be noted that only two dog leg linkages 19 and 20 are illustrated. However, if it is required to have the floor 21 of the carrying bays 8 and 9 moved down substantially parallel to the surface on which the vehicle 1 is resting then a miniumum of two such linkages 19 and 20 must be utilised.

FIG. 8 illustrates the loading section 3 in the retracted or transportation position. FIG. 7 illustrates the same arrangement however with only two straight linkages 15 and 16 being present. It will be noted in FIGS. 7 and 8 that there is a ramp 22 located at the rear of the load carrying section 3.

Figure 6:
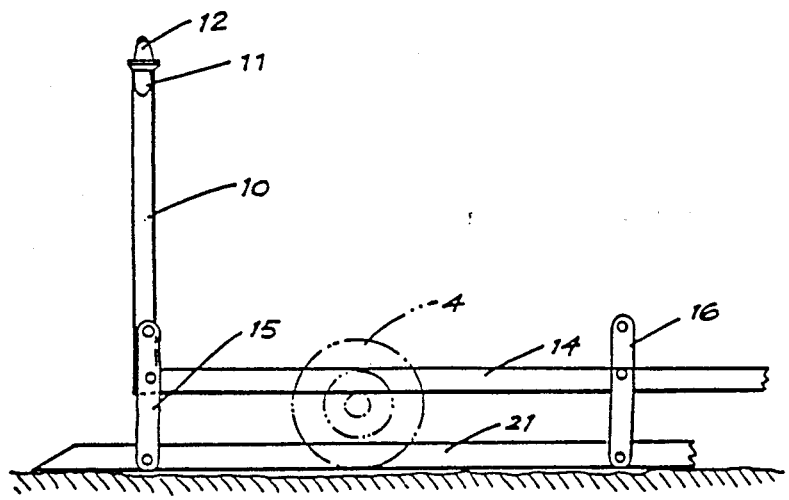
FIG. 6 is a side elevation view similar to that of FIG. 3.

Illustrated in FIGS. 3 and 6 is an initial prototype version which had no such ramp and required the floor 21 of the carrying bays 8 and 9 to rest at ground level beneath the vehicle 1. However, due to undulating and inconsistent surfaces beneath the vehicle, this could prevent the floor 21 from resting on ground thereby requiring the trolleys to be stepped up onto the carrying bays 8 and 9.

It was for this reason, that the ramp 22 has been included. The hydraulic cylinder 18 is powered either by a hydraulic motor run directly off the engine (not illustrated) which is included under the bonnet 23 of the cabin section 2 or, hydraulic pressure is provided by means of an electric motor powered by the electricity supplied from the generator of the engine (not illustrated).

FIG. 9 illustrates the ramp 22 and floor 21 in the loading or lowered position. This position is attained by the hydraulic cylinder retracting the control rod 24 which moves member 25 in the direction of arrow 26. This is more clearly illustrated in FIG. 10. Referring to FIG. 12 which illustrates the rear load carrying section 3 in the fully lowered position. The movement of the member 25 in the direction of arrow 26 moves the floor 21 in the direction of arrows 27 and 28, i.e. downwards and rearwards. This in turn lowers the ramp 22 which engages the chassis 14 by means of a sliding linkage 29 which slides in a slot 30 provided at the rear of the chassis member 14. By providing the ramp 22 and the lowering of the floor 21, the height which the trolleys must be raised in order to place them into the carrying bays 8 and 9, is greatly reduced.

Moving now to FIG. 11, in order to raise the floor 21 back into the body of the vehicle 1, the hydraulic cylinder 18 extends the control rod 24 in the direction of arrow 31 thereby rotating the linkages 19 and 20 in an anticlockwise direction. This subsequently moves the floor 21 in the direction of arrow 32 and 33, i.e. forwardly and upwardly whilst simultaneously drawing the ramp 22 towards the vehicle 1 by the sliding linkage 29 sliding in the slot 30.

The forgoing describes one embodiment of the present invention, and modifications made by those skilled in the art, can be made thereto without departing from the scope of the present invention.

Figure 14:
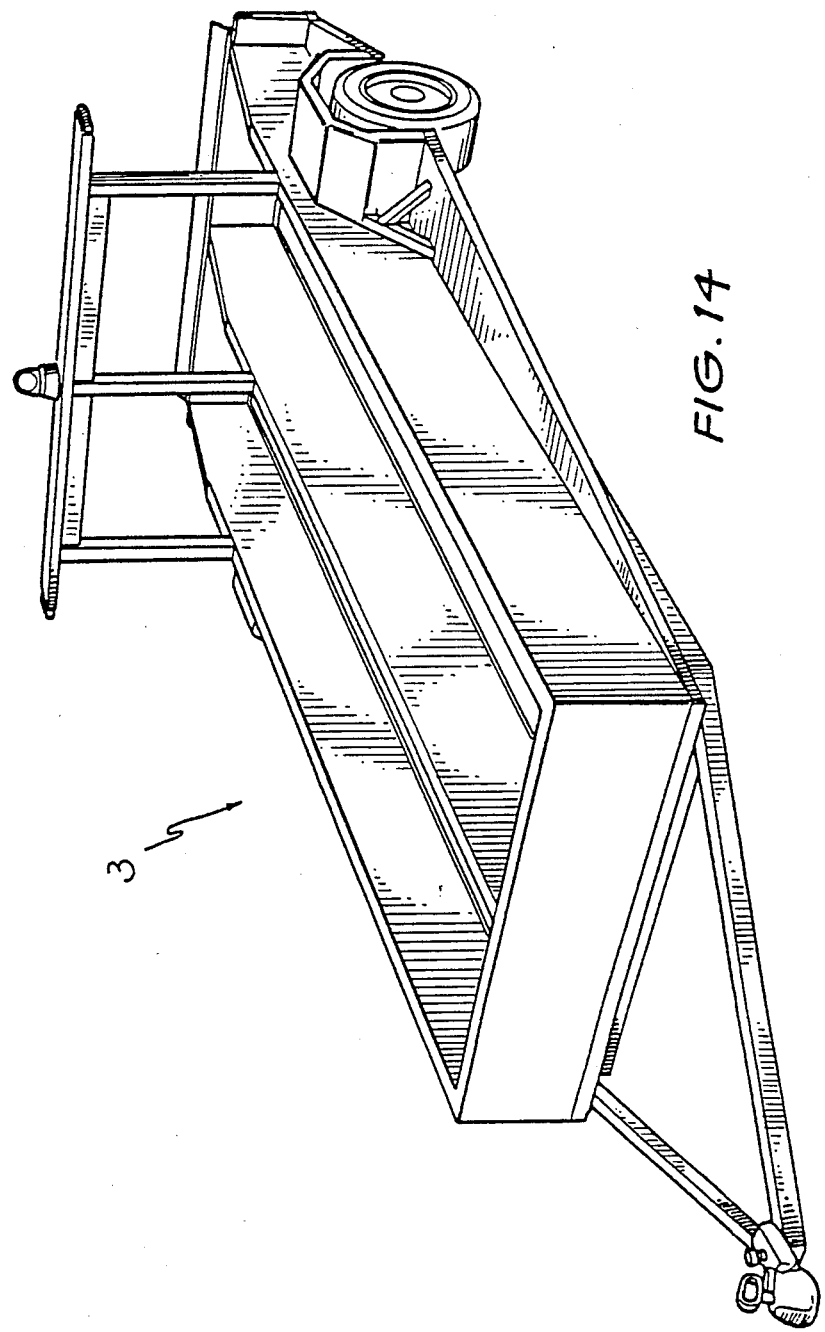
FIG. 14 is a perspective view of another embodiment of the present invention.

As shown in FIG. 14 the carrying trays could be mounted on a trailer with controls operably controlled from a small powered vehicle which is adapted to tow the trailer.

Such things as having air cylinders instead of hydraulic or pneumatic cylinders to power the raising and lowering of the floor 21 can be utilised. Separate control for each of the carrying bays 8 and 9 can be incorporated, running boards can be added to the side of the vehicle as shown in FIGS. 13 and 14, canopies can be also used to protect the operator and essential control equipment from the elements.

The exposed panels of the vehicle can be painted with advertising and the like in order to promote particular products of the supermarket or provide sponsorship and advertising for interested parties.

I claim:
1. A vehicle comprising:
   a wheeled body,
   a tray swingably movable by link means mounted on said wheeled body for movement between an upper transportation position and a lower ground engaging loading position,
   a connecting means for connecting said tray to said wheeled body such that said tray retains the substantially same horizontal orientation throughout its movement between said upper transportation position and said lower loading position,
   a rear ramp pivotally positioned at the rear of said tray and movable between a generally horizontally extending ground engaging position and a raised generally vertical position generally blocking the rear of said tray, and
   a mechanical leverage means connected between said tray and body for lowering said ramp to said ground engaging position in response to said tray being lowered to said lower loading position and for raising said ramp to said raised position in response to said tray being raised to said transportation position.
2. The vehicle of claim 1 including,
   said connecting means comprising a dog leg linkage means.
3. The vehicle of claim 2 including,
   said dog leg linkage means comprising a pair of dog leg linkages.
4. The vehicle of claim 1 including, said wheeled body comprising a powered wheeled body.
5. The vehicle of claim 4 including,
said powered wheeled body comprising an engine-powered wheeled body.
6. The vehicle of claim 1 including,
said connecting means comprising a straight linkage means.
7. The vehicle of claim 1 including,
said connecting means including a linkage means pivotally connected to said wheeled body and to said tray, and an extendable cylinder means connected to said linkage means.
8. The vehicle of claim 7 including,
said cylinder means being mounted to said wheeled body.
9. The vehicle of claim 7 including,
said linkage means comprising a dog leg linkage.
10. The vehicle of claim 7 including,
said linkage means comprising a straight linkage.
11. The vehicle of claim 7 including,
said mechanical leverage means including a sliding linkage means connected to said wheeled body.
12. The vehicle of claim 11 including,
said sliding linkage means being pivotally connected to said ramp.
13. The vehicle of claim 11 including,
said wheeled body including a longitudinal slot, and said sliding linkage means sliding in said slot.
14. The vehicle of claim 13 including,
said sliding linkage means being pivotally connected to said ramp, and
said linkage means comprising a dog leg linkage.
15. The vehicle of claim 1 including,
said rear ramp comprising first and second ramps positioned side by side and defining respectively first and second bays.

* * * * *